US006273595B1

(12) United States Patent
Wittmeier et al.

(10) Patent No.: US 6,273,595 B1
(45) Date of Patent: Aug. 14, 2001

(54) HEADLIGHT FOR VEHICLE

(75) Inventors: Erwin Wittmeier, Gomaringen; Juergen Wulf, Ingolstadt; Friedemann Schlienz, Tuebingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/404,070

(22) Filed: Sep. 23, 1999

(30) Foreign Application Priority Data

Sep. 25, 1998 (DE) ............................................. 198 43 986

(51) Int. Cl.[7] ................................ B60Q 1/04; F21V 7/09
(52) U.S. Cl. .......................... 362/518; 362/307; 362/348
(58) Field of Search .................................... 362/297, 304, 362/307, 348, 349, 516, 517, 518

(56) References Cited

U.S. PATENT DOCUMENTS 4,797,797 * 1/1989 Collot et al. ......................... 362/348
4,992,911 * 2/1991 Ressia .................................. 362/516
5,055,981 * 10/1991 Nino .................................... 362/517
5,469,339 * 11/1995 Iiyama et al. ........................ 362/516
5,651,610 * 7/1997 Fadel .................................... 362/348

FOREIGN PATENT DOCUMENTS 41 31 483 A1 3/1993 (DE) .

* cited by examiner

*Primary Examiner*—Alan Cariaso
(74) *Attorney, Agent, or Firm*—Michael J. Striker

(57) ABSTRACT

A headlight for a motor vehicle having a light source, a reflector having a substantially concavely curved reflection surface by which a light emitted by the light source is reflected for producing a predetermined illumination intensity distribution, the reflector having at least one further reflection surface which follows the concave reflection surface in a light outlet direction, a light-permeable member located in a beam path of the light reflected by the reflector and formed so that the light passes through the light-permeable member without being substantially influenced, the at least one further reflection surface of the reflector being subdivided at least locally by visible separating lines into several facets, at least a part of the facets being formed so that the light emitted by the light source is reflected by the at least one part of the facets into at least one lateral region in front of the vehicle.

7 Claims, 2 Drawing Sheets

HEADLIGHT FOR VEHICLE

BACKGROUND OF THE INVENTION

The present invention relates to a headlight for vehicles.

Headlights are known in the art. One of such headlights is disclosed for example in the German patent document DE 41 31 483 A1. The headlight has a light source and a reflector. The reflector has a concavely curved reflection surface, by which light emitted by the light source is reflected for producing a predetermined illumination intensity distribution. The reflector has at least one further reflection surface which is connected to its concavely curved reflection surface and faces in the light outlet direction. The further reflection surface is formed on a lower limiting surface of the reflector. The light outlet opening of the headlight is covered with a light-permeable member or disk, through which the light reflected by the reflector passes and is not substantially influenced. The further reflection surface is formed flat and has such an inclination, that the light reflected from it is not oriented upwardly but extends horizontally or is inclined downwardly and cause no blinding. In a headlight, in which the predetermined illumination intensity distribution is produced at least substantially by the shape of the concave reflection surface of the reflector and the cover disk substantially has no optical action, it is difficult under certain conditions to obtain a sufficient illumination of lateral regions in front of the vehicle. In particular when the reflector is arranged in a housing and its concave reflection surface is arranged at a distance from the front edge of the housing, the light outlet of the light reflected by the concave reflection surface is prevented by the housing to illuminate the lateral regions in front of the vehicle. In general, in the known headlight no sufficient illumination is possible for lateral regions in front of the vehicle, and the illumination intensity distribution produced by the concave reflection surface for the reflected light ends at the side abruptly, which is perceived as disturbing by a vehicle driver.

SUMMARY OF THE INVENTION

Accordingly, it is an object of the present invention to provide a headlight for a vehicle which eliminates the disadvantages of the prior art.

In keeping with these objects and with others which will become apparent hereinafter, one feature of present invention resides, briefly stated in a headlight in which the at least further reflection surface of the reflector at least locally is subdivided by visual separating lines into several facets, wherein at least a part of the facets is formed so that the light emitted by the light source is reflected by this part in at least one lateral region in front of the vehicle.

When the headlight is designed in accordance with the present invention, then by the at least one further reflection surface, a sufficient illumination of at least one lateral region in front of the vehicle is provided. Since the further reflection surface is arranged in the light outlet direction after the concave reflection surface, this reflected light can exit the headlight even in unfavorable mounting position of the reflector.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
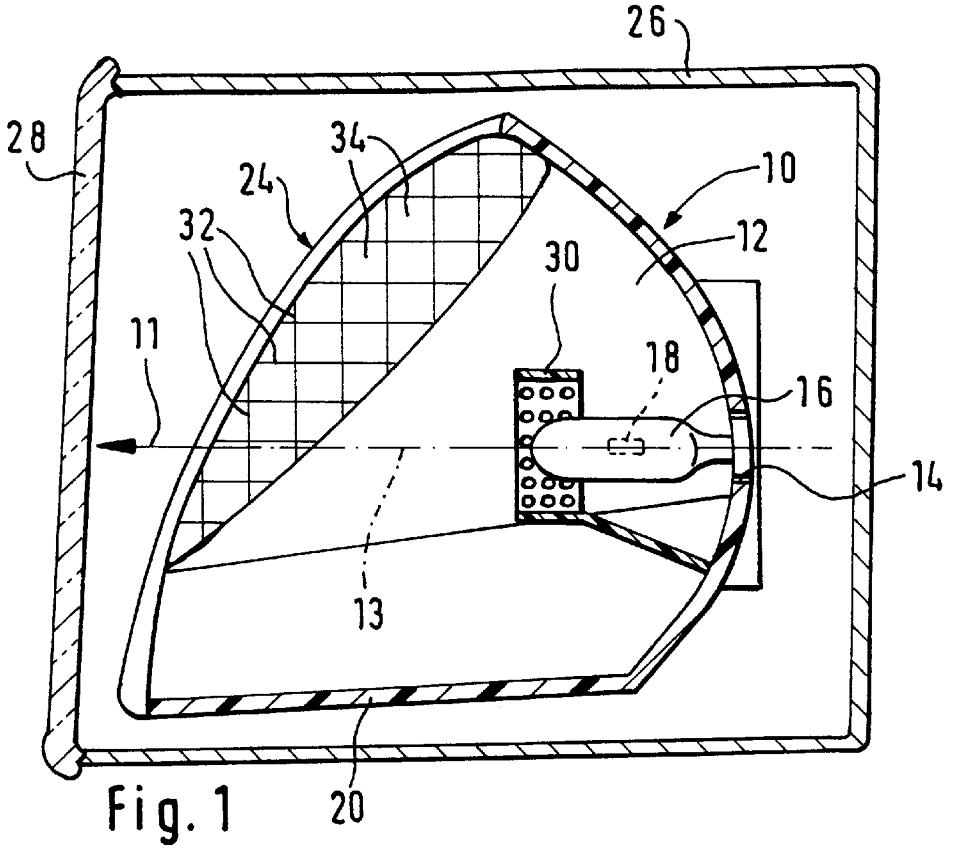
FIG. 1 is a view showing a headlight in a vertical longitudinal section in accordance with a first embodiment of the present invention.
Figure 2:
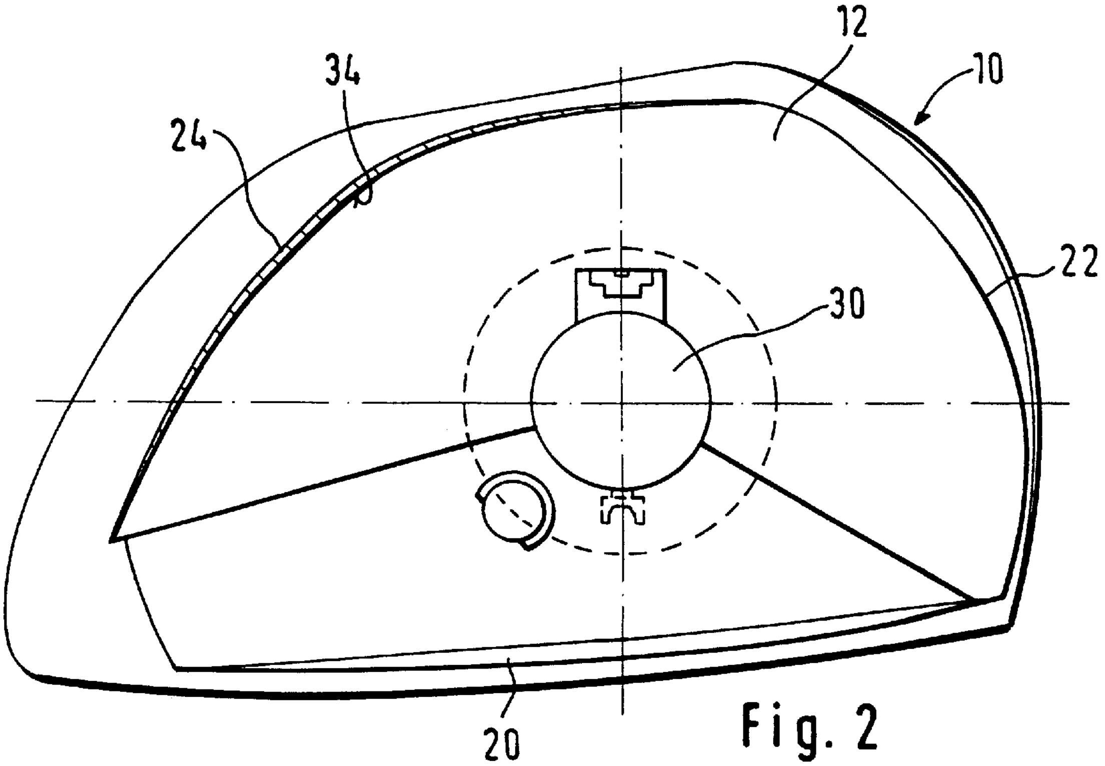
FIG. 2 is a view showing a cross-section of the headlight of FIG. 1 taken along the line II—II.
Figure 3:
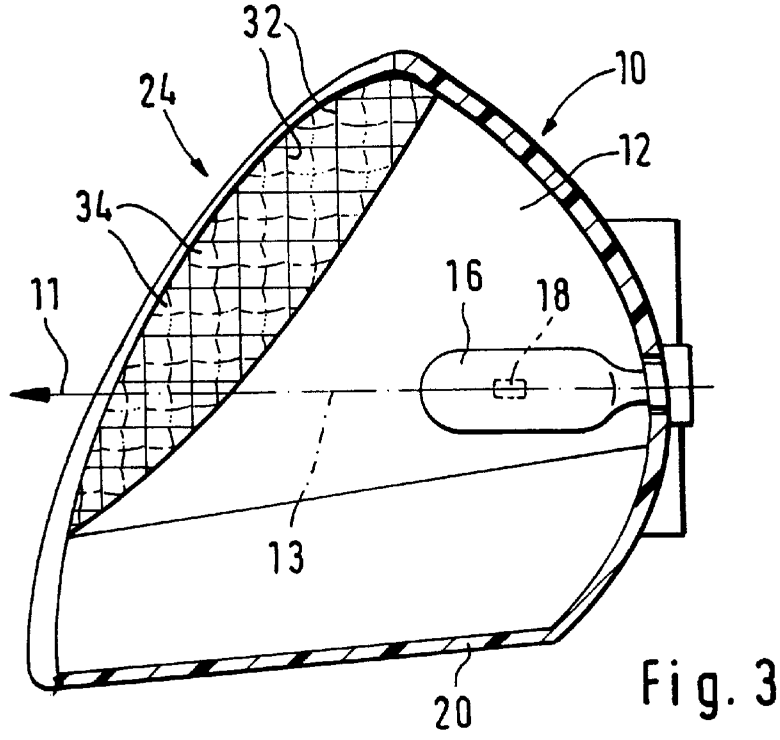
FIG. 3 is a view showing a vertical longitudinal cross-section of the headlight in accordance with a second embodiment of the present invention.

A headlight for a vehicle, in particular a motor vehicle, which is shown in FIGS. 1–3 operates at least for production of a low beam light, but also the high beam light can be produced by the headlight as well. The headlight is formed for mounting on a vehicle in a conventional and not shown manner. In a known manner, two headlights can be arranged on the same vehicle. The headlight has a reflector 10 which can be composed of metal or synthetic plastic. The reflector 10 has a substantially curved reflection surface 12, which extends in the region of the apex of the reflector 10 and outwardly beyond it. The concave reflection surface 12 has an opening 14, in which a light source 16 is inserted. The light source can be an incandescent lamp or a gas discharge lamp. The light source 16 has preferably one light body 18 arranged substantially parallel to the optical axis 13 of the reflection surface 12. In correspondence with the design of the light source 16 the light body can be formed as an incandescent coil or a light arc.

Further reflection surfaces 20, 22, 24 are connected with the concave reflection surface 12 of the reflector 10 at its edges in the light outlet direction 12. The reflector 10 can have for example a further reflection surface 20 connected to the lower edge of the concave reflection surface 12, which is substantially flat. Further reflection surfaces 22, 24 of the reflector 10 can be provided over the remaining periphery of the concave reflection surface 12. They can be also formed flat or they can be curved as shown in FIG. 2. The design of the further reflection surfaces 20, 22, 24 of the reflector 10 generally corresponds to the desired visual image of the reflector 10. In other words it depends on whether a rectangular, a rounded or any other appearance must be provided.

The reflector 10 has a further reflection surface 24 which extends substantially in a lateral peripheral region of the reflector 10 and can extend up to an upper peripheral region of the reflector 10. The further reflection surface 24 can be arranged on the side of the reflector 10 facing toward the vehicle outer side or at the side of the reflector 10 facing toward the vehicle center.

The reflector 10 is arranged in a housing 26, whose light outlet opening is covered with a light-permeable disk 28 composed of glass or plastic. The cover disk 28 is connected with a front edge of the housing 26 which surrounds the light outlet opening. The cover disk 28 is formed substantially smooth. In other words, it substantially does not have any optical profiles which could otherwise deviate and/or disperse the light passing through it. The concave reflection surface 12 of the reflector 10 is arranged at a distance opposite to the light outlet direction 11 from the cover disk 28 in the housing 26. The further reflection surfaces 20, 22, 24 of the reflector 10 extend starting from the concave reflection surface 12 to the cover disk 28. However, a distance remains between it and the cover disk 28 for providing an adjustment of the reflector 10 in the housing 26.

The concave reflection surface 12 of the reflector 10 is formed so that the light of the light source 16 is reflected by it for producing a predetermined illumination intensity distribution. As mentioned above, the cover disk 28 has substantially no optical profiles by which the light reflected by the concave reflection surface 12 can be deviated and/or dispersed during passage through the cover disk 28. The illumination intensity distribution is provided in particular by prescribed regulations for the low beam.

Figure 4:
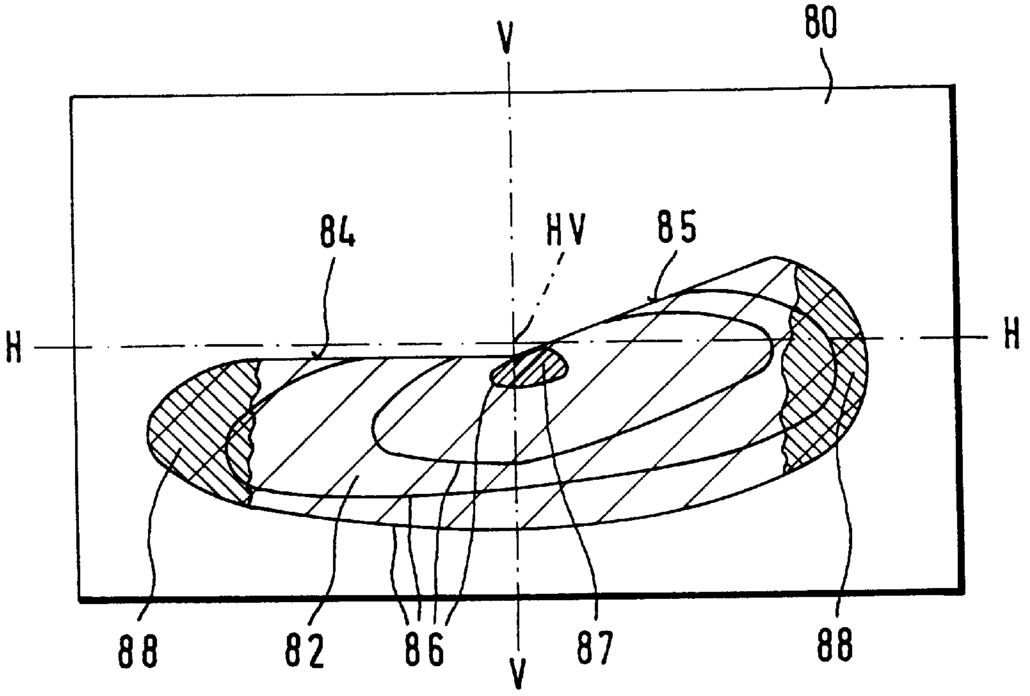
FIG. 4 is a view showing a measuring screen arranged in front of the inventive headlight.

FIG. 4 shows a measuring screen 80 arranged at a distance in front of the headlight. It is illuminated by a light bundle emitted by the reflector. The horizontal central plane of the measuring screen 80 is identified as HH and its vertical central plane is identified as VV. The horizontal central plane HH and the vertical central plane VV intersect in a point HV. A region 82 is marked on the measuring screen 80, which is illuminated by the light bundle emitted by the headlight. The region 82 will be explained herein below in an examplary fashion in accordance with the prescribed regulations in Europe. If the headlight is used in countries outside Europe, for example in USA or Japan, the region 82 will be determined in correspondence with the prescribed regulations in these countries. The region 82 is limited from above by a bright-dark limit. At the counter traffic side, which in the shown embodiment for right traffic is the left side of the measuring screen 80, it has a portion 80 for extending substantially horizontally and substantially under the horizontal central plane HH. At the traffic side, which in the shown embodiment for right traffic is provided at the right side of the measuring screen 80, the bright-dark limit has a portion 85 which extends from the horizontal portion 84 to the right and raises. The angle under which the portion 85 extends to a horizontal line is substantially 15°. Illustration of the illumination intensity distribution in the region 82, several lines of the same illumination intensity, or so-called isolux lines 86 are provided inside the region 82. The highest illumination intensity values are provided in the region 82 in a zone 87 closesly under the bright-dark limit 84, 85 and in the region of the vertical central plane VV of the measuring screen 80 or substantially at the right of it. Thereby an efficient illumination of a distant region in front of the vehicle is provided. Downwardly and toward the lateral edges the illumination intensity decreases in the region 82 continuously.

The shape of the concave reflection surface 12 of the reflector 10 can be determined numerically from the illumination intensity distribution to be produced in the region 82. The concave reflection surface 12 can be distributed into a plurality of small surface portions, which are oriented so that the light is reflected by them in predetermined partial regions of the region 82. The flat portions are connected with one another continuously, or in other words to form a step-free or in some cases bend-free surface. The concave reflection surface 12 can be subdivided into different shaped partial regions or facets.

Depending on the arrangement of the concave reflection surface 12 of the reflector 10 in the housing 26 at a distance from the cover disk 28, the light reflected from the reflection surface 12 can extend significantly inclined to the optical axis 13 and not exit the headlight, since it is screened by the lateral, as well as upper and/or lower wall of the housing 26 and/or the further reflection surfaces 20, 22, 24 of the reflector 10. With the light reflected by the concave reflection surface 12, in particular the lateral edge zones of the region 82 can be illuminated not sufficiently in certain conditions. FIG. 4 shows the lateral edge zones 88 of the region 82, which here are not illuminated or not sufficiently illuminated. It can be quite disturbing when the region 82 ends laterally abruptly, since here the illumination intensity reduces not continuously to the edge zones 88. The edge zones 88 of the region 82 of the measuring screen 80 correspond to lateral edge zones of a roadway in front of the vehicle, or lateral zones near the roadway.

In order to provide a sufficient illumination also in the edge zones 88 of the region 82 and at least approximately continuous decrease of the illumination intensity to the edge zones 88, it is proposed in accordance with the present invention to use at least one of the further reflection surfaces 22, 23, 24 of the reflector 10 to reflect the light emitted by the light source 16 in at least one of the edge zones 88. For example, it suffices for this purpose to use the further reflection surface 24, which is arranged in a lateral and upper peripheral region of the reflector 10. The further reflection surface 24 is subdivided by visible separating lines 32 in a plurality of facets 34. The subdivision of the reflection surface 24 can be performed by the separating lines 32 for example as shown in FIG. 1 in a chess-board-pattern manner, so that the individual facets 34 have a substantially rectangular shape.

The separating lines 32 can extend in any different ways, so that the facets 34 correspondingly can have different shapes, for example trapezoidal, round or oval. The separating lines 32 can be formed as groove-shaped depressions, as web-shaped raised formations, or as steps between the facets 34. Each facet 34 of the reflection surface 24 can be determined with respect to its shape and direction so that the light of the light source 16 is reflected by it in a desired direction, in particular in such a direction that at least one of the edge zones 88 is illuminated by it. With the light reflected by the facets 34, and at least approximately continuous illumination intensity is provided in at least one of the edge zones 88. provided in at least one of the edge zones 88.

The facets 34 can each be formed substantially flat. It can be provided that all facets 34 of the reflection surface 24 are shaped and oriented so that the light reflected by them illuminates at least one of the edge zones 88. Alternatively, it can be provided that only a part of the facets 34 is shaped and oriented so that the light reflected by them illuminates at least one of the edge zones 88, while another part of the facets 34 is shaped and oriented so that the light reflected by them illuminates for example the region 82 and overlaps with the light reflected by the concave reflection surface 12.

Since the further reflection surface 34 with the facets 34 is arranged opposite to the concave reflection surface 12 of the reflector 10 farther in the light outlet direction 11 and thereby closer to the front edge of the housing 26, the light reflected by the facets 34 can, also when it is inclined to the optical axis 13, exit the headlight and thereby provide a sufficient illumination of the lateral edge zones 88. When the further reflection surface 24 with the facets 34 is arranged at the side of the headlight facing toward the outer vehicle edge, then by the facets 34 preferably the light is reflected into the opposite lateral edge zone 88. Concretely this means that when the headlight is a right headlight of the vehicle, the further reflection surface 24 is arranged toward the right edge of the vehicle, and the light is reflected by its facets 34 into the link lateral edge zone 88. In correspondence with this, the further reflection surface 24 for the left headlight of the vehicle is arranged toward the light edge of the vehicle and the light is reflected by its facets 34 in the right edge zone 88. The above presented lateral characteristics are valid for an observation of a headlight in the light outlet direction 11.

Alternatively, the further reflection surface 24 of the reflector 10 can be arranged at the side facing the vehicle center. The light in this case is reflected by the facets 34 to the edge zone 88 located at the same side as the headlight. Concretely it means that when the headlight is used as the right headlight of the vehicle, the further reflection surface 24 is arranged at the left side of the reflector 10 toward the vehicle center and the light is reflected by this facet 34 into the right lateral edge zone 88. Correspondingly, the further reflection surface 24 in the event of the left headlight of the vehicle is arranged at the right side of the reflector 10 toward the vehicle center, and with its facets 34 the light is reflected into the left edge zone 88. It is also possible that the further reflection surfaces 24 and 25 are arranged at both sides of the reflector 10 and provided, as described above with the facets 34. The light is reflected by them to eliminate at least one lateral edge zone 88.

A beam screen 30 can be associated with the light source 16, so that the light emitted by the light source 16 directly in the light outlet direction 11 is at least partially screened. The beam screen 30 is formed so that the light emitted by the light source 16 can impinge at least partially on a part of the facets 34 of the further reflection surface 24. The beam screen 30 can be formed either so that the beam path between the light source 16 and the further reflection surface 24 is not covered or is at least partially covered. Alternatively, the beam screen 30 can have one or several openings, for example formed as a perforation, so that the light emitted by the light source 16 can partially pass through the beam screen 30 and reach the further reflection surface 24.

As can be understood from the preceding, only a part of the facets 34 of the further reflection surface 24 can be shaped and oriented so that the light is reflected by it in at least one edge zone 88. The remaining facets 34 can be arranged identically as the original further reflection surface 24. Therefore the subdivision into the facets 34 is performed only by the separation lines 32.

FIG. 3 shows the headlight in accordance with a second embodiment, in which the basic construction remains the same as in the first embodiment. However, the construction of the facets 34 is modified. The facets 34 here are not flat, but instead are concavely or convexly curved. The light emitted by the light source 16 is reflected by at least a part of the facets 34 into at least one edge zone 88.

It will be understood that each of the elements described above, or two or more together, may also find a useful application in other types of constructions differing from the types described above.

While the invention has been illustrated and described as embodied in headlight for vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a motor vehicle, comprising a light source; a reflector having a substantially concavely curved reflection surface by which a light emitted by said light source is reflected for producing a predetermined illumination intensity distribution, said reflector having at least one further reflection surface which follows said concave reflection surface in a light outlet direction; a light-permeable member located in a beam path of the light reflected by said reflector and formed so that the light passes through said light-permeable member without being substantially influenced, said at least one further reflection surface of said reflector being subdivided at least locally by visible separating lines into several facets, at least a part of said facets being formed so that the light emitted by said light source is reflected by said at least one part of said facets into at least one lateral region in front of the vehicle, said at least one further reflection surface being formed so that the light reflected by said facets of said at least one further reflection surface continues the illumination intensity distribution produced by the light reflected by said concave reflection surface at least at one side and at least approximately continuously, and an illumination intensity distribution which is produced by the light reflected by said concave reflection surface in at least one lateral region has a low illumination intensity while the light reflected by said at least one further reflection surface increases the illumination intensity in said at least one lateral region.

2. A headlight as defined in claim 1, wherein said subdivision of said at least one further reflection surface is formed at least approximately in a chess-board like manner.

3. A headlight as defined in claim 1, wherein said at least one part of said facets is formed so that the light emitted by said light source and reflected by said at least one part of said facets is reflected in at least one lateral region in front of the vehicle which is not illuminated or is illuminated only weakly by the light reflected by said concave reflection surface.

4. A headlight as defined in claim 1, wherein at least a part of said facets is at least flat.

5. A headlight as defined in claim 1, wherein said at least a part of said facets is curved.

6. A headlight as defined in claim 1, wherein said at least one further reflection surface extends at least over a part of a lateral peripheral region of said reflector.

7. A headlight as defined in claim 1; and further comprising a housing having a front edge which faces in the light outlet direction and with which said light-impermeable member is connected, said reflector being arranged in said housing, said reflection surface being arranged at a distance from said light-impermeable member, said at least one further reflection surface extending starting from said concave reflection surface toward said light-impermeable member.

* * * * *